March 23, 1948.    H. R. RICH    2,438,129
VAPOR DISSEMINATOR
Filed Dec. 13, 1944

INVENTOR.
HYMAN R. RICH
BY
Brayton W Richards
ATTORNEY

Patented Mar. 23, 1948

2,438,129

UNITED STATES PATENT OFFICE 2,438,129

VAPOR DISSEMINATOR

Hyman Richard Rich, Milwaukee, Wis., assignor, by mesne assignments, to The Diversey Corporation, Chicago, Ill., a corporation of Illinois Application December 13, 1944, Serial No. 567,973

1 Claim. (Cl. 299—24)

The invention relates to improvements in vapor disseminators, and has for its primary object the provision of an improved construction for the purpose which is simple in construction and highly efficient in use.

Other objects will appear hereinafter.

The invention consists of the combinations and arrangements of parts hereinafter described and claimed.

The invention will be best understood by reference to the accompanying drawings forming a part of this specification and in which—

Figure 1:
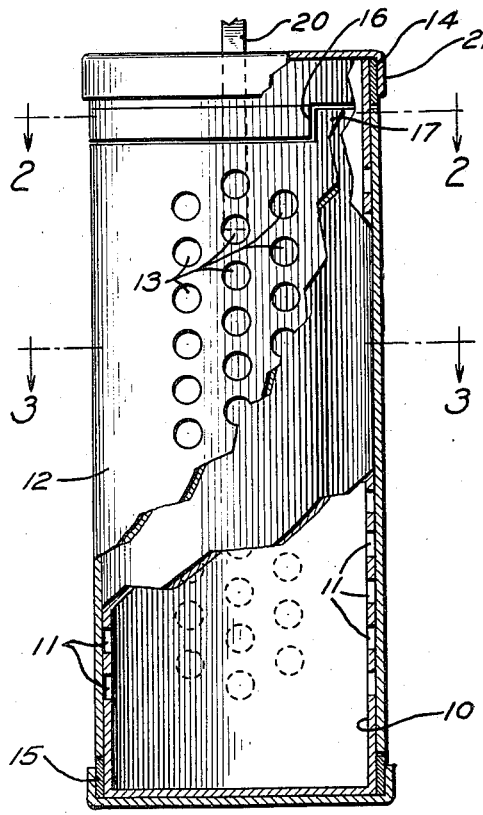
Figure 2:
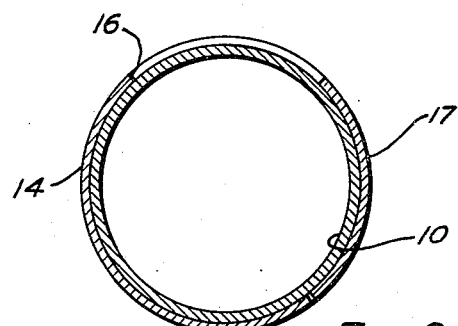
Figure 3:
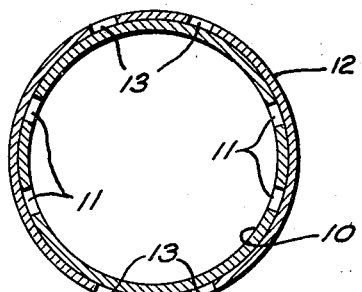

Fig. 1 is a side view, shown partially in section, of a container embodying the invention;

Fig. 2, a section taken substantially on line 2—2 of Fig. 1;

Fig. 3, a section taken substantially on line 3—3 of Fig. 1; and

Figure 4:
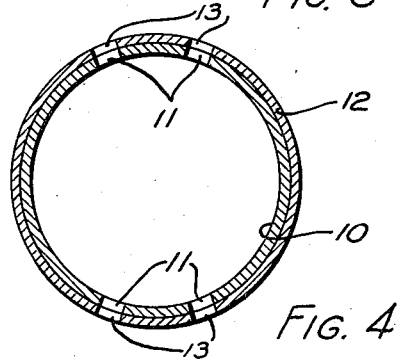

Fig. 4, a section similar to Fig. 3 but showing the parts in positions for disseminating vapors.

The embodiment of the invention illustrated in Figs. 1, 2, 3 and 4 comprises a cylindrical container 10 which may conveniently be made of cardboard or the like, and is provided in the opposite side walls with perforations 11 adapted and arranged to cause dissemination of vapors from volatile crystals or the like in said container. A sealing member 12 in the form of a cylindrical sleeve or shell is shiftably mounted upon the exterior of the container 10 so as to be capable of rotation thereon, and is provided with perforations 13 arranged to be brought into and out of registration with the perforations 11 by relative rotation between said casing and the container. The casing 12 is held upon the periphery of the container 10 by means of bands 14 and 15 secured respectively around the top and bottom thereof as shown. The band 14 is provided with a notch 16 and the casing 12 is provided with a projection 17 fitting into the notch 16 and arranged to limit the rotations of the casing 12 on the container 10 in one direction at the position in which the openings 11 and 13 are in registration with each other, and in the other direction in the position in which said perforations are out of the registration with each other.

In this way a container for volatile substance is provided which may be readily sealed whenever desired, or opened for dissemination of vapors therefrom by simple rotation of the casing 12 on the container 10, as explained above.

A suitable cap 21 is provided for sealing the container 10, and if desired the container may be equipped with a strap 20 by which it may be suspended.

While I have illustrated and described the preferred form of construction for carrying the invention into effect, this is capable of variation and modification without departing from the spirit of the invention. I therefore do not wish to be limited to the precise details disclosed, but desire to avail myself of such variations and modifications as fall within the scope of the appended claim.

I claim:

A vapor disseminator comprising: a cylindrical container having perforations in the wall thereof; a cylindrical sealing member encompassing the cylinder side of said container and shiftable thereon, said sealing member having perforations arranged to be brought into registration with said first mentioned perforations; and means for limiting the shifting of said sealing member in one direction with said perforations in registration and in the other direction with said perforations out of registration, said means comprising an annular band member at one end of the sealing member and an interfitting projection and notch on said members.

HYMAN RICHARD RICH.

REFERENCES CITED

The following references are of record in the file of this patent:

UNITED STATES PATENTS

| Number | Name | Date |
| --- | --- | --- |
| 1,732,028 | Reiner | Oct. 15, 1929 |
| 2,247,600 | Brennan et al. | July 1, 1941 |
| 2,276,217 | Lee | Mar. 10, 1942 |
| 537,141 | Bragonier | Apr. 9, 1895 |
| 984,352 | Costello | Feb. 14, 1911 |
| 1,380,208 | Holtschneider | May 31, 1921 |
| 1,676,943 | Dargavel | July 10, 1928 |
| 1,782,919 | Feldman | Nov. 25, 1930 |